US010898902B2

(12) United States Patent
Ma et al.

(10) Patent No.: US 10,898,902 B2
(45) Date of Patent: Jan. 26, 2021

(54) PRODUCTION LINE FOR RECYCLING AND PROCESSING WASTE MATERIALS OF STEEL ROLLING

(71) Applicant: Taiyuan University of Science and Technology, Taiyuan (CN)

(72) Inventors: Lifeng Ma, Taiyuan (CN); Xiao Hu, Taiyuan (CN); Jinli Meng, Taiyuan (CN); Rongjun Wang, Taiyuan (CN); Lianyun Jiang, Taiyuan (CN); Heyong Han, Taiyuan (CN); Jingfeng Zou, Taiyuan (CN); Qingxue Huang, Taiyuan (CN)

(73) Assignee: TAIYUAN UNIVERSITY OF SCIENCE AND TECHNOLOGY, Taiyuan (CN)

( * ) Notice: Subject to any disclaimer, the term of this patent is extended or adjusted under 35 U.S.C. 154(b) by 208 days.

(21) Appl. No.: 16/137,590

(22) Filed: Sep. 21, 2018

(65) Prior Publication Data

US 2019/0184405 A1 Jun. 20, 2019

(30) Foreign Application Priority Data

Dec. 20, 2017 (CN) .......................... 2017 1 1379504
Dec. 20, 2017 (CN) .......................... 2017 1 1379522
Dec. 20, 2017 (CN) .......................... 2017 1 1379571

(51) Int. Cl.
*B02C 23/38* (2006.01)
*B02C 19/00* (2006.01)
(Continued)

(52) U.S. Cl.
CPC .......... *B02C 23/38* (2013.01); *B02C 19/0062* (2013.01); *B02C 21/00* (2013.01);
(Continued)

(58) Field of Classification Search
CPC ... B02C 19/0062; B02C 23/38; B23D 31/008; B23D 31/04
See application file for complete search history.

(56) References Cited

U.S. PATENT DOCUMENTS 3,180,249 A * 4/1965 Patros ................. B23D 31/008
100/39
10,584,060 B2 * 3/2020 Baumgartenn ......... B02C 23/10
(Continued)

*Primary Examiner* — Faye Francis
(74) *Attorney, Agent, or Firm* — Matthias Scholl P.C.; Matthias Scholl

(57) ABSTRACT

A production line for recycling and processing waste materials of steel rolling, the production line including: an electromagnetic hoisting equipment; a conveying platform; a clamping-and-feeding device; a segmentation shear; a swing conveyor device; a pushing device; a rolling-type shearing machine; a chain-type conveyor track; a material guiding device; two shredding-type shearing machines; and a scrap collection device. The electromagnetic hoisting equipment is connected to the conveying platform, and is configured to hoist waste materials of steel rolling to the conveying platform; the conveying platform is connected to the clamping-and-feeding device, and is configured to convey the waste materials to the clamping-and-feeding device; the segmentation shear cooperates with the clamping-and-feeding device and is configured to segment the waste materials of steel rolling into steel plates; the pushing device is configured to push the steel plates to the rolling-type shearing machine.

12 Claims, 13 Drawing Sheets

(51) Int. Cl.
 B02C 21/00 (2006.01)
 B02C 23/02 (2006.01)
 B23D 31/00 (2006.01)
 B23D 15/12 (2006.01)
 B23D 33/08 (2006.01)
 B21D 43/00 (2006.01)
 B23D 15/04 (2006.01)
 B23D 31/04 (2006.01)
 B23D 31/02 (2006.01)
 B23D 35/00 (2006.01)
 B23D 33/02 (2006.01)

(52) U.S. Cl.
 CPC .............. *B02C 23/02* (2013.01); *B21D 43/00* (2013.01); *B23D 15/04* (2013.01); *B23D 15/12* (2013.01); *B23D 31/00* (2013.01); *B23D 31/008* (2013.01); *B23D 31/02* (2013.01); *B23D 31/04* (2013.01); *B23D 33/02* (2013.01); *B23D 33/08* (2013.01); *B23D 35/005* (2013.01)

(56) References Cited

U.S. PATENT DOCUMENTS

| | | | |
|---|---|---|---|
| 2011/0000991 A1* | 1/2011 | Takakura | B30B 9/326 241/63 |
| 2015/0367535 A1* | 12/2015 | Kulesa | B02C 21/00 264/140 |
| 2017/0232446 A1* | 8/2017 | Hillis | B02C 23/14 241/24.1 |
| 2017/0341084 A1* | 11/2017 | Brouwer | B02C 4/30 |
| 2017/0349484 A1* | 12/2017 | Baumgartenn | B02C 23/20 |
| 2018/0036803 A1* | 2/2018 | Yamamoto | B03C 1/025 |
| 2019/0275529 A1* | 9/2019 | Manzanares Mercero | B02C 18/142 |

* cited by examiner

PRODUCTION LINE FOR RECYCLING AND PROCESSING WASTE MATERIALS OF STEEL ROLLING

CROSS-REFERENCE TO RELAYED APPLICATIONS

Pursuant to 35 U.S.C. § 119 and the Paris Convention Treaty, this application claims foreign priority to Chinese Patent Application No. 201711379504.9 filed Dec. 20, 2017, Chinese Patent Application No. 201711379522.7 filed Dec. 20, 2017, and Chinese Patent Application No. 201711379571.0 filed Dec. 20, 2017. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND

The disclosure relates to the field of mechanical shear technology, and more particularly to a production line for recycling and processing waste materials of steel rolling.

Shearing equipment is usually disposed on a steel rolling line to cut off a head portion of a rolled steel blank that does not meet a preset temperature, to ensure the rolled steel blank entering finish rolling process meets the temperature requirement.

The rolled steel blanks produced by conventional shearing equipment have different sizes, shapes and uneven thicknesses. This leads to relatively low efficiency in subsequent recycling process.

SUMMARY

The disclosure provides a production line for recycling and processing waste materials of steel rolling. The work process of the production line is continuous, stable, automated, and efficient in waste recycling and processing.

Disclosed is a production line for recycling and processing waste materials of steel rolling, the production line comprising:
- an electromagnetic hoisting equipment;
- a conveying platform;
- a clamping-and-feeding device;
- a segmentation shear;
- a swing conveyor device;
- a pushing device;
- a rolling-type shearing machine;
- a chain-type conveyor track;
- a material guiding device;
- two shredding-type shearing machines; and
- a scrap collection device.

The electromagnetic hoisting equipment is connected to the conveying platform, and is configured to hoist waste materials of steel rolling to the conveying platform; the conveying platform is connected to the clamping-and-feeding device, and is configured to convey the waste materials to the clamping-and-feeding device; the segmentation shear cooperates with the clamping-and-feeding device and is configured to segment the waste materials of steel rolling into steel plates; the pushing device is configured to push the steel plates to the rolling-type shearing machine; the rolling-type shearing machine cooperates with the pushing device to divide the steel plates along a width direction of the steel plates into strips; the chain-type conveyor track is configured to convey the strips to the shredding-type shearing machines; the material guiding device is disposed on one end of the chain-type conveyor track, and is configured to deliver the strips to the two shredding-type shearing machines, respectively; the two shredding-type shearing machines are configured to further cut the strips into pieces; and the scrap collection device is connected to the two shredding-type shearing machines.

The conveying platform can comprise a centering device and an auxiliary detecting device to ensure that the blank horizontally enters the segmentation shear, and feedback the size information of the blank to a control system, and calculate the number of subsequent segments and the head-cutting amount in advance.

The clamping-and-feeding device can be driven by the stepper motor, and segmentation of the plates of different specifications can be accomplished through the control of the feeding amount of the steel plate-blanks by the control system.

The segmented shear can comprise an inclined chute, to cause the cut-off head-portion material to slide down into a waste-material collection device for the segmentation shearing process.

The pushing direction of the pushing device can be perpendicular to the conveying direction of the conveying platform, to save space occupied by the device.

The rolling-type shearing machine can comprise an output chute, and the blank after being stripped automatically slides down to the chain-type conveyor track.

The shredding-type shearing machine can comprise a flexible clamping-and-feeding device and a synchronous pressing device; the flexible clamping-and-feeding device is used for clamping and feeding the strips of different shapes and thicknesses to the shredding-type shearing machine, and when the strip travels beyond the shearing edge for a certain distance, the strip is blocked by a baffle behind the shearing edge, so that the shredded length of the strip is controlled; to prevent the strip from drifting during shearing, the strip needs to be pressed, and a specific workflow is: pressing-→shearing; to improve production efficiency and shorten time of the workflow, a working mode in which pressing and shearing are synchronously implemented is adopted, and thus the pressing device and the shearing device are connected in series; because a pressing stroke is shorter than a shearing stroke, it must be ensured that strips have been pressed before shearing is implemented by the shearing edge, and the differential stroke is compensated by an expansion amount of a spring group, and the pressing force of the pressing device can be adjusted by the preload of the spring group.

Due to the high frequency of shearing during striping, the width of the strips is relatively wide, resulting in relatively great shearing force. If an eccentric shear is adopted, when it shears a plate having a medium thickness, too large load will be applied on its eccentric shaft, this puts high strength requirement on the eccentric shaft, and to meet the strength requirement, the overall size of the equipment is relatively large, resulting in relatively high cost of the equipment. Moreover, under the action of the large alternating load, the eccentric shaft is prone to fatigue damage, which seriously affects the service life of the equipment. The rolling-cut-type shear with hydraulic transmission, adopted in the disclosure, has two hydraulic cylinders for driving a linkage mechanism to convert direct shearing into rolling-cut-type shearing, which reduces the force on the shearing edge during shearing, thus solving the above problem satisfactorily, besides, it has a simple structure, low cost, and high degree of automation.

The above-mentioned production line for recycling and processing waste materials of steel rolling has high automation degree and high adjustability of product specifications, reduces labor intensity, and provides safe and efficient production. By setting shearing machines with different functions, firstly large-block waste steel blank is subjected to segmentation shearing with fixed length, and then is transported to the rolling-type shearing machine for rolling-cut-type shearing, so that the shapes of the waste steel are relatively regular, and finally the waste steel are transported to two shredding-type shearing lines, respectively, for last shredding-type shearing, thus obtaining steel pieces with uniform shapes and small sizes which are convenient for recycling, thereby providing greater selectivity for subsequent recycling.

The clamping-and-feeding device can comprise: a four-link-rod lifting mechanism, a self-centering clamping-and-feeding unit, a stepper-type transmission-and-driving device, and a frame; the four-link-rod lifting mechanism is used for lifting and lowering the self-centering platform, to ensure that the self-centering clamping-and-feeding platform accurately clamps the tail portion of the plate; the stepper-type transmission-and-driving device employs rack-and-pinion transmission to rhythmically transfers steel plates to subsequent shearing mechanism. The disclosure has the features of a simple structure, high control-precision and strong stability for continuous production.

The four-link-rod lifting mechanism can comprise a lifting hydraulic cylinder, a fixing block, a link rod, an equal-arm link rod, an equal-arm link-rod frame, a lifting platform and a displacement detecting device; the lifting hydraulic cylinder is fixed on the stepper-type transmission-and-driving device by the fixing block; the lifting hydraulic cylinder is connected through the link rod to the lifting platform which is connected to the equal-arm link rod; one end of the equal-arm link rod is hinged with the link rod, and the other end is hinged with the equal-arm link-rod frame which is fixed on the stepper-type transmission-and-driving device; extension and contraction of the lifting hydraulic cylinder drives the lifting platform to move translationally up and down; the displacement detecting device transmits detection signals to the control system, and further adjusts the extension and contraction amount of the hydraulic cylinder through feedback signals of the control system, thereby realizing precise control of the position of the lifting platform.

The self-centering clamping-and-feeding unit can comprise: a fixed shaft, a clamp arm, a clamp cylinder, a slider, a sliding block, a slide-rail groove, an articulation shaft and a cross-link rod; the slide-rail groove is mounted on the lifting platform and has a sliding block built therein; the sliding block is fixed on the clamp arm by bolts. Meanwhile, the fixed shaft is fixed on the lifting platform and is hinged to the center of the cross-link rod. Both ends of the cross-link rod are hinged, respectively through the articulation shaft, with the slider which is disposed in the chute of the clamp arm. The clamp cylinder is fixed on the lifting platform, and can pull the clamp arm of one side to move translationally up and down, and through the link-rod-and-slider mechanism, causes the cross-link rod to rotate around the axis and at the same time pull the clamp arm of the other side to move translationally, meanwhile keeping the position of the center line between the two clamp arms unmoved, thus realizing the automatic centering function while clamping plates.

The stepper-type transmission-and-driving device can comprise a gear, a rack, a dual-output-shaft stepper motor, a displacement detecting device, a stopper, a coupling, a transmission shaft, a ball bearing, a bearing seat, a translational shaft, a rolling bearing, and a rail groove. The dual-output-shaft stepper motor transmits driving torque through the coupling to the transmission shaft, and the transmission shaft drives the gear to rotate; as the rack is fixed on the upper surface of the rail groove by screws, the gear can drive the lifting platform as a whole to move translationally along the index line of the rack. It should be noted that, to prevent the transmission shaft from bearing heavy bending moment, the four-link-rod lifting mechanism and the self-centering clamping-and-feeding unit are fixed on the translational shaft to ensure that the transmission shaft only bears torsional moment. Through the ball bearing and the bearing seat, the transmission shaft and the translational shaft are connected; rolling bearings are arranged at both ends of the translational shaft, so that the translational shaft can slide freely in the rail groove; the displacement detecting device cooperates with the stepper motor through the control system, improving the control of the displacement accuracy; to improve the safety and reliability of the whole device, and to prevent the whole device from travelling beyond its stroke and causing danger by collision with subsequent device, the stopper is mounted on the rail groove.

The four-link-rod lifting mechanism solves the issue of space waste for turning over the clamping device during conveying of the steel plates; the self-centering clamping-and-feeding unit fully combines the working condition that one side of the waste steel to be sheared is neat while the other side is rough, on the basis of ensuring that the steel plate is tightly and firmly clamped, and at the same time ensures that the steel plate is always in the center position, thus facilitating subsequent shearing; the stepper-type transmission-and-driving device fully considers the ability of the transmission shaft for bearing bending moment, and by using the stepper motor for driving, the feed rate of the plates can be dynamically controlled, so that the subsequent shearing device can cut out plates of different lengths.

The shredding-type shearing machine can comprise: a shredding-type shearing device, a multi-flexible clamping-and-feeding device, and a synchronous pressing device; the synchronous pressing device is connected in series with the shearing edge of the shredding-type shearing device, so that, at the time that the shearing edge moves downward for shearing, the pressing device also moves to press, but the pressing device reaches the blank earlier than the shearing edge, thus ensuring that the pressing device has pressed the plate tightly when the shearing edge shears the plate.

The shredding-type shearing device can comprise a frame, a tool holder, an eccentric shaft, a motor, a slider, a left wedge, a right wedge, a wear plate, an upper shearing edge and a lower shearing edge; the upper and lower shearing edges are respectively fixed on the tool holder and the frame; the motor is fixed on the frame, and the motor drives the eccentric shaft to rotate; the eccentric shaft drives the slider to move, and at the same time drives the tool holder to move up and down to accomplish shearing motion. It should be noted that, the upper and lower sides of the slider and the left and right sides of the frame are provided with wear plates, and the gap at the left and right sides of the tool holder can be adjusted by the pressing amount of the left and right wedges.

The multi-flexible clamping-and-feeding device can comprise an upper guide roller, a lower guide roller, a motor, a sprocket gear, a chain, an upper idler gear set, a lower idler gear set, an upper guide-roller frame, a lower guide-roller frame, a support screw, a tension spring, a rack, a gear and a gear coupling shaft; the motor is fixed on the lower guide-roller frame, and the motor drives the lower guide roller to rotate; to ensure that all the lower guide rollers rotate in the same direction, the lower idler gear set is used to provide transition between the guide rollers; the driving torque of the motor is transmitted, through the sprocket gear fixed on the lower idler gear set, and through the chain, to the upper guide roller; similarly, the upper guide rollers adopt the same transition mode, and the upper idler gear set ensures that the upper guide rollers rotate in the same direction; the upper and lower guide rollers, and the upper and lower idler gear sets are respectively mounted on the upper and lower guide-roller frames, and the upper and lower guide rollers rotate in opposite directions, so as to clamp and feed the steel plates to a shearing position. It should be noted that, due to the different sizes and specifications of the plates, the thicknesses and shapes of the plates are also irregular, if a gap between the upper and lower guide rollers is fixed, it will cause the plates to jam during clamping and feeding or the plates cannot enter the path of the pinch rollers. To solve the above problem, the upper guide-roller frame is hinged on the rack, and the upper guide-roller frame as a whole can rotate around the hinge point; the distance between the upper and lower guide rollers is adjusted by the support screws at the left and right sides, while keeping a certain inclination angle, thus ensuring that strips of various thicknesses can smoothly enter the guide rollers; to prevent the plates from slipping in the guide rollers, the tension spring is arranged at the exit of the plates, to ensure a certain pressing force is provided between the upper and lower guide rollers; meanwhile, due to the irregular shapes of the plates, there is a jam phenomenon when the strips enter the guide rollers; to avoid the jam phenomenon, the upper guide-roller frame can drift up and down; further, to prevent deflection when the guide-roller frame drifts, the racks hinged on both sides of the upper guide-roller frame are connected in series through the gear coupling shaft, thus ensuring the same drift displacement on both sides.

The synchronous pressing device can comprise a lug ring, a steel guide wire, a rail wheel, a spring set, a pressure spring and a lever-type pressing frame. The lug ring is fixed on the tool holder and connected to the steel guide wire; the steel guide wire is wound around the rail wheel and connected to the spring set; the lower end of the spring set is connected to the lever-type pressing frame which is hinged on the frame, and the lever-type pressing frame is driven to move downwards; the return stroke of the lever-type pressing frame is realized by the pressure of the pressure spring. The device can move up and down together with the upper shearing edge, but the pressing stroke of the device is shorter than that of the upper shearing edge, therefore the pressing function can be realized before the upper shearing edge contacts the blank, thus preventing the plate from drifting during shearing, and ensuring dimensional accuracy of the plate. As the upper shearing edge and the lever-type pressing frame are connected in series, the displacement difference between the lever-type pressing frame and the tool holder is offset by the elastic deformation of the spring set, and the pressure of the pressing frame can be adjusted by the spring set.

The shredding-type shearing machine of the disclosure has a simple structure and high reliability. The multi-flexible clamping-and-feeding device can quickly clamp and feed strips of different sizes and specifications with irregular shapes and thicknesses; the synchronous pressing device greatly shortens the time of the whole pressing-shearing process, and significantly improves production efficiency in a high-speed shearing work line, thus providing convenient conditions for recycling of waste steel.

Figure 1:
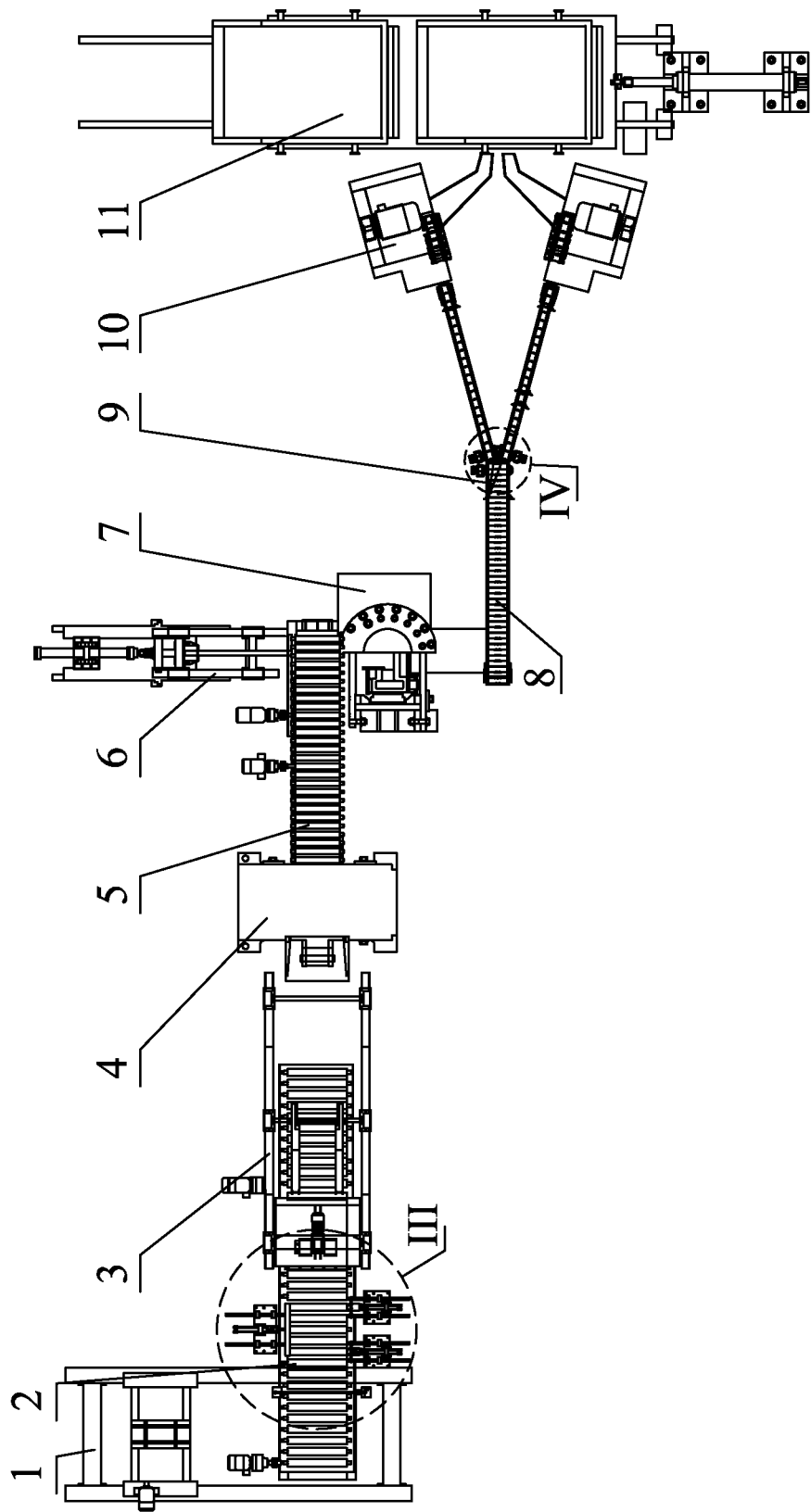
FIG. 1 is a top view of a production line for recycling and processing waste materials of steel rolling of the disclosure.
Figure 2:
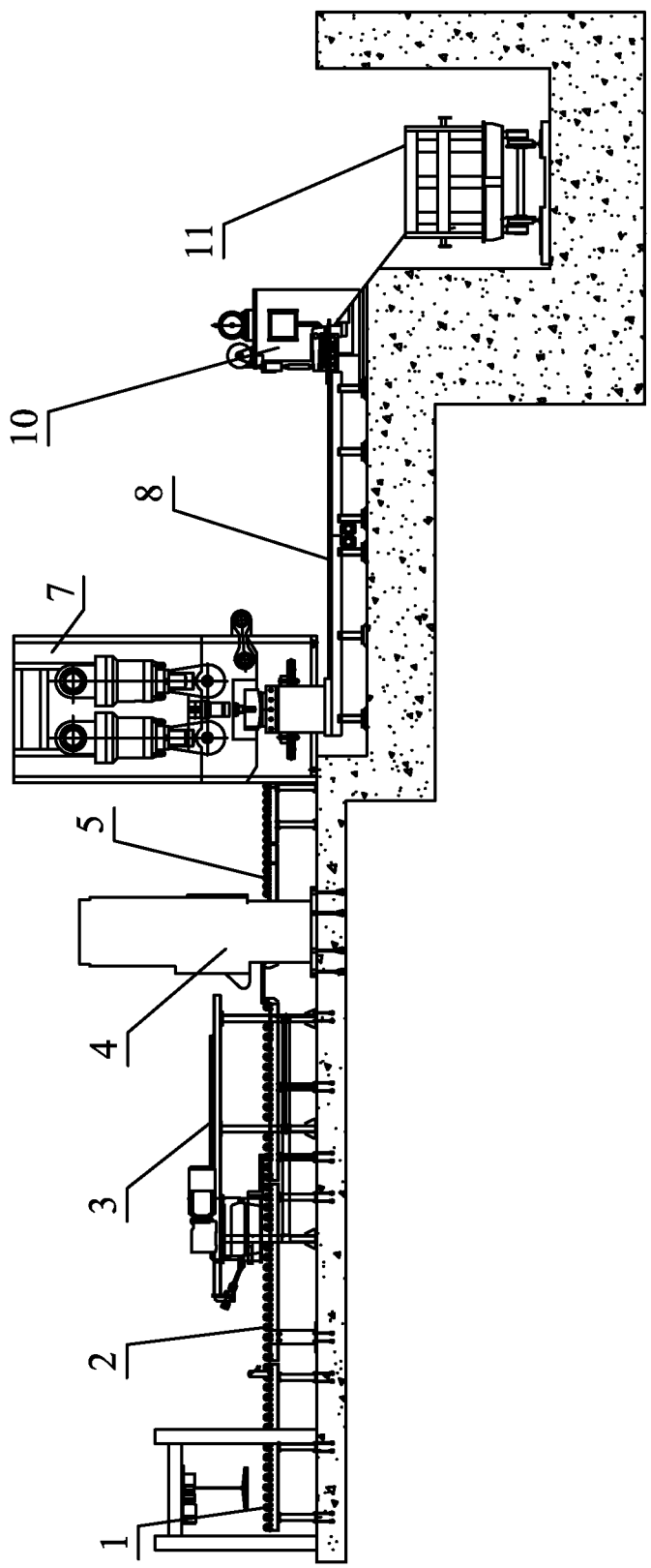
FIG. 2 is a front view of a production line for recycling and processing waste materials of steel rolling of the disclosure.

In the drawings, the following reference numbers are used: 1. Electromagnetic hoisting equipment; 2. Conveying platform; 3. Clamping-and-feeding device; 4. Segmentation shear; 5. Swing conveyor device; 6. Pushing device; 7. Rolling-type shearing machine; 8. Chain-type conveyor track; 9. Material guiding device; 10. Shredding-type shearing machine; 11. Scrape collection device; 12. Centering device.

31. Stepper motor; 32. Position detecting device; 33. Fixing block; 34. Lifting hydraulic cylinder; 35. Link rod; 36. Lifting platform; 37. Clamp cylinder; 38. Sliding block; 39. Displacement detecting device; 310. stopper; 311. Track groove; 312. Equal-arm link rod; 313. Slider; 314. Cross-link rod; 315. Slide-rail groove; 316. Clamp arm; 317. Rack; 318. Gear; 319. Transmission shaft; 320. Coupling; 321. Bearing seat; 322. Translational shaft; 323. Roller bearing; 324. Equal-arm link-rod frame; 325. Articulation shaft; 326. Fixed shaft; 327. Ball bearing; 328. Frame;

41. Lower shearing edge; 42. Upper shearing edge; 43. Left wedge; 44. Wear plate; 45. Right wedge; 46. Tool holder; 47. Slider; 48. Eccentric shaft; 49. Frame; 410. Adjusting screw; 411. Motor; 412. Lug ring; 413. Rail wheel; 414. Steel guide wire; 415. Spring set; 416. Lever-type pressing frame; 417. Rack; 418. Upper guide roller; 419. Support screw; 420. Chain; 421. Lower guide roller; 422. Lower idler gear set; 423. Gear; 424. Tension spring; 425. Upper idler gear set; 426. Sprocket gear; 427. Gear shaft; 428. Upper guide-roller frame; 429. Lower guide-roller frame; 430. Motor for driving roller; 431. Pressure spring; 432. Preloaded spring.

DETAILED DESCRIPTION

As shown in FIGS. 1-4, a production line for shearing and recycling waste steel, comprises: an electromagnetic lifting equipment 1, a conveying platform 2, a clamping-and-feeding device 3, a segmentation shear 4, a swing conveyor device 5, a pushing device 6, a rolling-type shearing machine 7, a chain-type conveyor track 8, a material guiding device 9, a shredding-type shearing machine 10, a scrap collection device 11, and a centering device 12.

Figure 3:
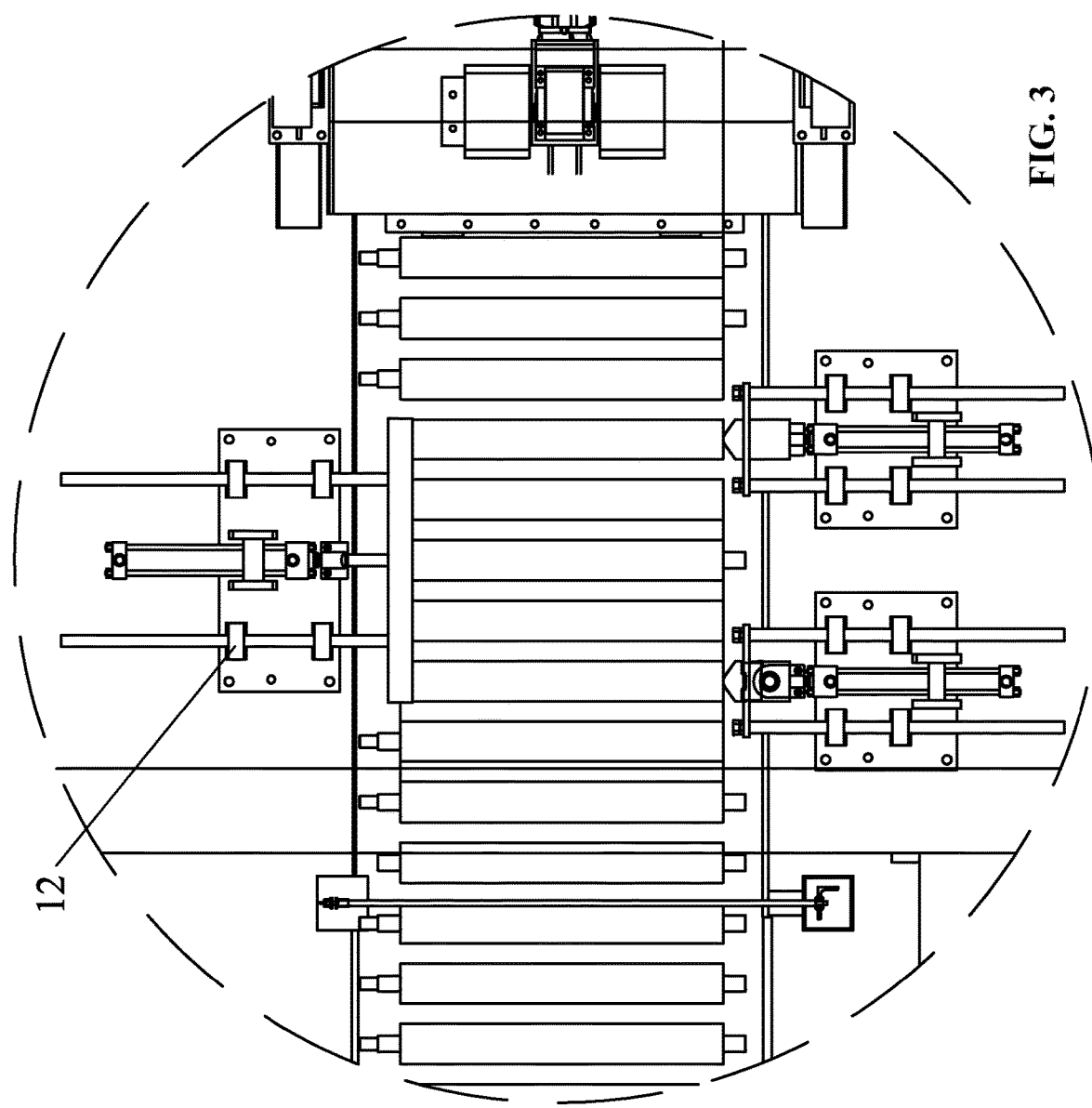
FIG. 3 is a partial enlarged view of part III of a centering device in FIG. 1 of the disclosure.
Figure 4:
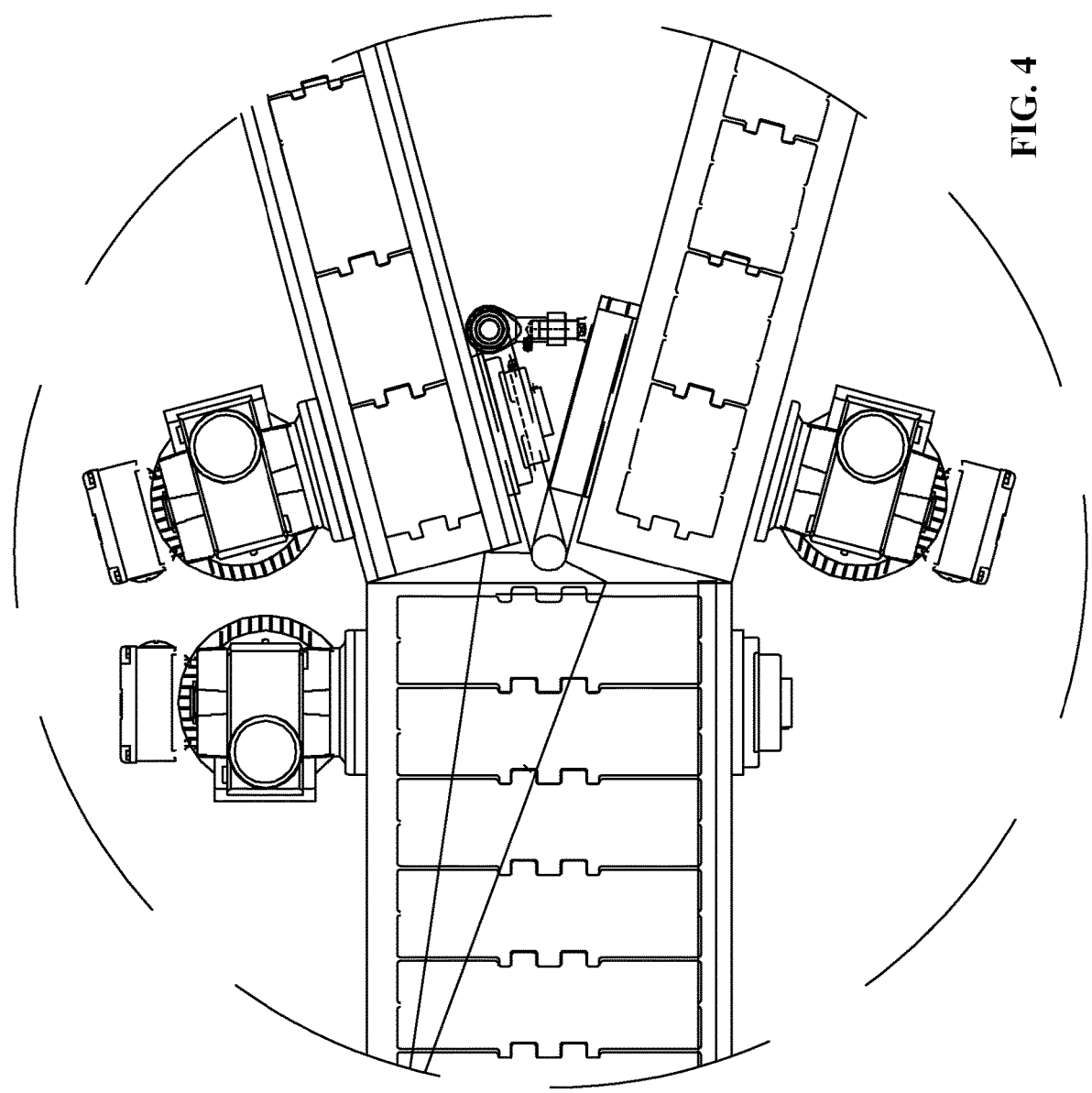
FIG. 4 is a partial enlarged view of part IV of a material-guiding device in FIG. 1 of the disclosure.

The working principle of the production line for recycling and processing waste materials of steel rolling of the disclosure is as follows:

First, raw materials are transported to the conveying platform 2 by using tools such as the electromagnetic lifting equipment; after the raw materials are placed, the raw materials are conveyed by the conveying platform 2 to the segmentation shear 4. In the process of conveying, while the raw materials pass through the conveying platform 2, their position adjustment along the axis of the rollers is automatically carried out by the centering device 12; it should be noted that, as the raw materials themselves are mostly cut-off waste steel, with the edge of one side being regular straight line, thus, as shown in FIG. 3, a centering method is adopted for such condition, i.e., a straightline of one side and two points of the opposite side, and the specific working mode is as follows: one clamp side and two clamp points are moved simultaneously to the center line of the steel plate-blanks, and after being moved a certain distance, since the edge of one side of the steel plate-blanks is irregular, the distance to the regular edge is different, thus there is a case where one of the clamp points and the one clamp side contact the steel plate-blanks firstly, meanwhile, due to the irregularity of the edge, the contact force at the clamp point is not parallel with the moving direction of the clamp point, which tends to cause the blank to rotate, so that a gap is formed between the clamp side and the regular edge, which affects the centering effect. For this reason, when the clamp side and the clamp point are subjected to a certain clamping force, the movement stops, meanwhile the other clamp point continues to move, thus restraining the rotation tendency due to the edge irregularity, thereby achieving complete centering of the steel plate-blanks.

After the steel plate-blanks are centered, the clamping-and-feeding device 3 transports the raw materials stepwise to the segmentation shear 4, and shearing is done with the cooperation of the clamping-and-feeding device 3 and the segmentation shear 4. When the incoming material needs to be cut off its head portion, the cut-off head portion of the material will pass through the inclined chute of the segmentation shear 4, and slide down into the scrap collection device for the segmentation shear; after the cutting of the head portion, the incoming material is sheared into plates of a certain size, by the cooperation of the clamping-and-feeding device 3. In the meantime, the blank that has not been sheared by the segmentation shear 4 will travel beyond the shearing edge for a distance in the shearing process, and the over-traveled blank is placed on the track, hence, to avoid the shearing force of the shearing edge to crush the track, the track behind the segmentation shear is designed as the swing conveyor device 5 which can swing up and down and thus performs the function of cutter-relieving.

The segmented plates are transported by the conveying function of the swing conveyor device 4 to the side of the rolling-type shearing machine 7. The plates are pushed, at a constant speed by the pushing action of the stepper-type pushing device 6, to the rolling-type shearing machine 7 for shearing and stripping, thus the plates are sheared into strips having a width smaller than or equal to a certain small size; the sheared strips, under the action of gravity and along an output chute of the rolling-type shearing machine 7, slide down onto the chain-type conveyor track 8.

To improve the shredding efficiency of the strips, the strips obtained by the striping process are simultaneously shredded by two shredding-type shears 10. The strips are conveyed through the chain-type conveyor track 8 to the material guiding device 9, and by means of the swing of the material guiding device 9, the strips are distributed individually to the chain-type tracks leading to the shredding-type shearing machines 10, so that the strips are sheared into steel pieces of a certain size by the shredding-type shearing machines 10. After the shearing, the steel pieces fall into the scrap collection device 11 under the action of its own gravity. It should be noted that, the shredding-type shearing machine 10 comprises pinch rollers and a pressing device, which clamp the strips on the chain-type conveyor track 8 and feed them to the shearing edge; moreover, a baffle is arranged behind the shearing edge, and the position of the baffle can be adjusted to control the size of the steel pieces; when the strip arrives at the baffle, the pressing device presses the strips tightly, thereafter the shearing edge of the shredding-type shearing machine 10 shreds the strips.

As shown in FIGS. 5-8, the clamping-and-feeding device of the disclosure comprises: a four-link-rod lifting mechanism, a self-centering clamping-and-feeding unit, a stepper-type transmission-and-driving device and a frame. The four-link-rod lifting mechanism can comprise a displacement detecting device 32, a fixing block 33, a lifting hydraulic cylinder 34, a link rod 35, a lifting platform 36, an equal-arm link rod 312, and an equal-arm link-rod frame 324; the lifting hydraulic cylinder 34 is hinged and fixed by the fixing block 33 on the stepper-type transmission-and-driving device; one end of the link rod 35 is hinged with an telescopic end of the rear lifting hydraulic cylinder 34, while the other end is hinged to a hinge point with the equal-arm link rod 312 and the lifting platform 36 on the left side, thus forming a composite hinge. In addition, for the equal-arm link rods 312 on both sides, one end is hinged with the lifting platform 36, and the other end is hinged with the equal-arm link-rod frame 324 fixed on the stepper-type transmission-and-driving device, thus forming a parallel-four-sided linkage mechanism; the lifting platform 36 is moved up and down by extension and contraction of the lifting hydraulic cylinder 34; the detected position of the equal-arm link rod 312 can be transmitted to a control system by the displacement detecting device 32; the control system processes the input signal, and adjusts the amount of extension and contraction of the lifting hydraulic cylinder 34 through a feedback signal, thus achieving precise control of the position of the lift platform.

As shown in FIGS. 5-8, the self-centering clamping-and-feeding unit comprises: a clamp cylinder 37, a sliding block 38, a slider 313, a cross-link rod 314, a slide-rail groove 315, a clamp arm 316, an articulation shaft 325 and a fixed shaft 326; the slide-rail groove is mounted on the lifting platform and has the sliding block 38 built therein; the sliding block 38 is fixed on the clamp arm 316 by bolts, to ensure that the clamp arm 316 can only move in the horizontal direction. The fixed shaft 326 is fixed on the lifting platform 36 and is hinged to the center of the cross-link rod 314; both ends of the cross-link rod 314 are hinged, respectively through the articulation shaft 325, with the slider 313 which is disposed in the chute of the clamp arm 316. The clamp cylinder 37 is fixed on the lifting platform, and can pull the clamp arm 316 of one side to move translationally up and down, and through the link-rod-and-slider mechanism, causes the cross-link rod 314 to rotate around the axis of the fixed shaft 326, to convert the arcuate displacement of the end of the cross-link rod 314 into left and right sliding of the slider 313 and up and down sliding of the opposite-side clamp arm 316, and to ensure that the position of the center line between the two clamp arms 316 is not moved, thereby realizing the automatic centering function while clamping plates.

Figure 5:
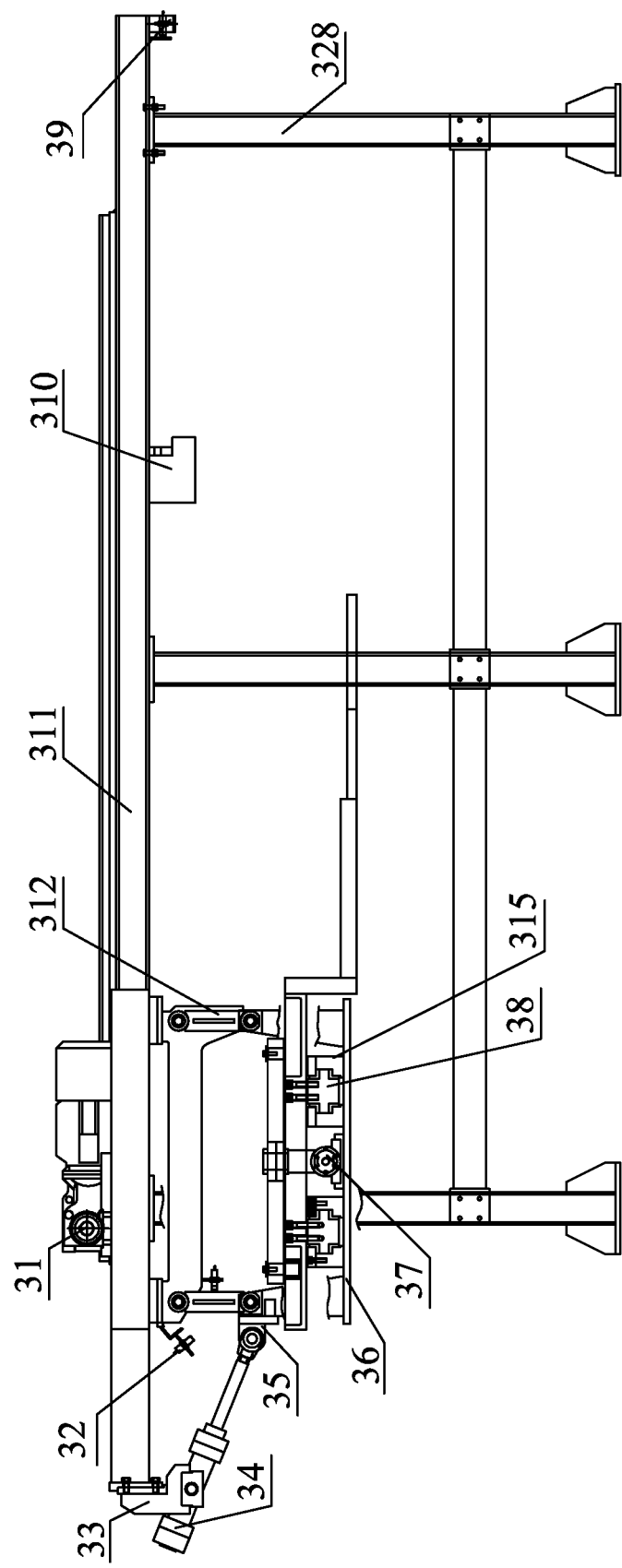
FIG. 5 is a front view of a waste-steel clamping-and-feeding device of the disclosure.
Figure 6:
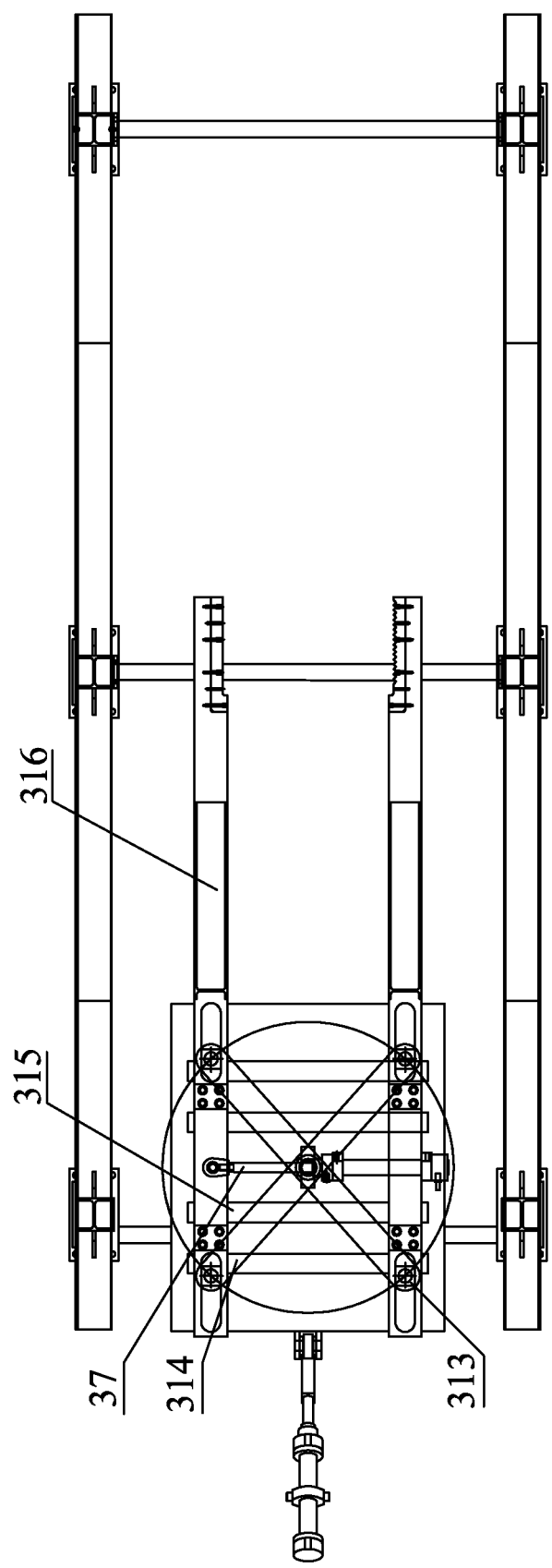
FIG. 6 is a top partial view of a waste-steel clamping-and-feeding device of the disclosure.
Figure 7:
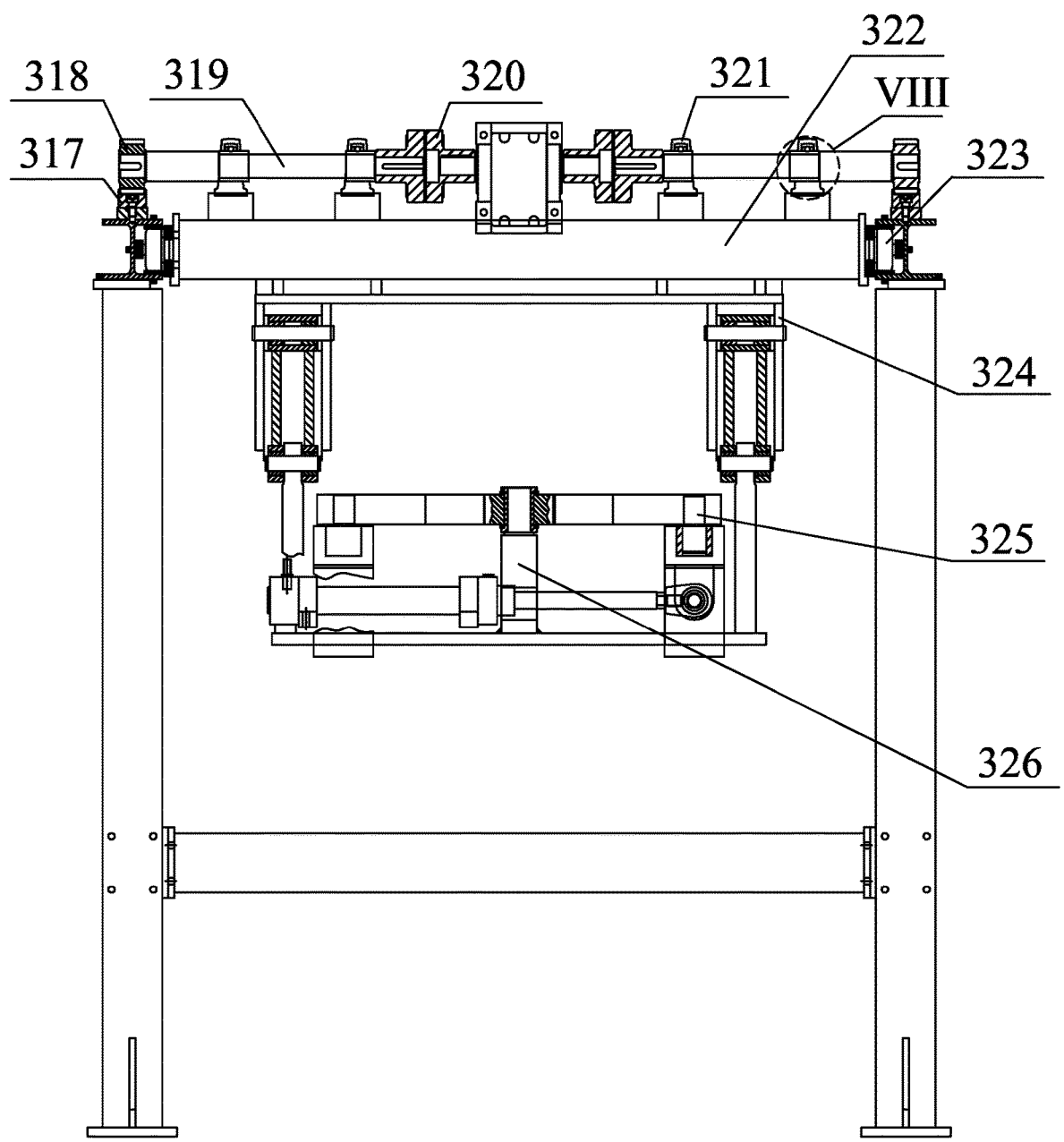
FIG. 7 is a left-side partial view of a waste-steel clamping-and-feeding device of the disclosure.
Figure 8:
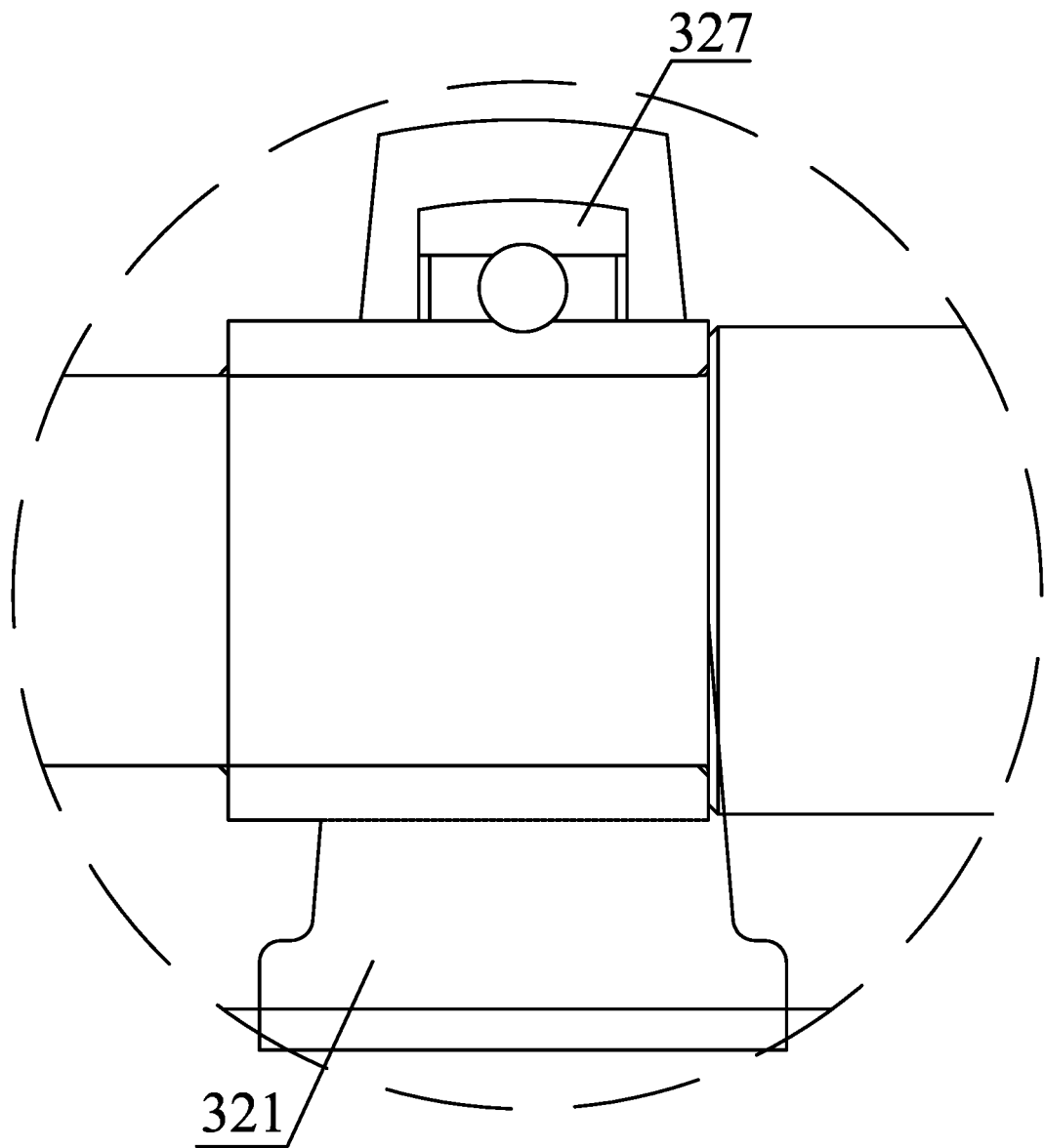
FIG. 8 is a partial enlarged view of part VIII in FIG. 7.

As shown in FIGS. 5, 7, and 8, the stepper-type transmission-and-driving device comprises: a dual-output-shaft stepper motor 31, a displacement detecting device 39, a stopper 310, a rail groove 311, a rack 317, a gear 318, a transmission shaft 319, a coupling 320, a bearing seat 321, a translational shaft 322, a rolling bearing 323, and a ball bearing 327; the dual-output-shaft stepper motor 31 is fixed on the translational shaft 322, and the dual-output-shaft stepper motor 31 transmits driving torque through the coupling 320 to the transmission shaft 319; the transmission shaft is restrained by the ball bearing 327 and the bearing seat 321 fixed on the translational shaft 322, and drives the gear 318 to rotate. As the rack 317 is fixed on the upper surface of the rail groove 311, and the rail groove is fixed on the frame 328, thus the gear can only drive the lifting platform 36 as a whole to move translationally along the index line of the rack. It should be noted that, the rolling bearing 323 is arranged at both ends of the translational shaft 322, so that the translational shaft 322 can slide freely in the rail groove 311. Due to the relatively large total weight of the four-link-rod lifting mechanism and the self-centering clamping-and-feeding unit, the four-link-rod lifting mechanism and the self-centering clamping-and-feeding unit are fixed on the translational shaft 322, to share the load of the transmission shaft, so that the transmission shaft only bears torsional moment. In the meantime, the displacement detecting device 39 cooperates with the stepper motor through the control system, improving precision of the stepper-type transmission-and-driving device for controlling displacement and stroke; to prevent the overall device from travelling beyond its stroke in the event of a system failure and causing a collision with subsequent equipment, the stopper 310 is intentionally mounted on the rail groove 311 for protection.

The specific working process is as follows: a conveyor track is installed between the frames of the clamping-and-feeding device; before the waste steel plates being fed arrive, the control system sends a command to the lifting hydraulic cylinder 34, the hydraulic cylinder contracts, and thus pulls the link rod 35 to drive the lifting platform 36 move translationally upward, with the position of the lifting platform 36 being detected by the position detecting device 32, then the lifting platform 36 stops after the clamp arm 316 is away from the conveyor track for a certain distance; after the steel plate as a whole passes through and a corresponding signal is detected by the detecting device, the conveyor track stops moving, and the control system issues a unloading command to the lifting hydraulic cylinder 34, thus the lifting platform 36 is lowered down to the clamping work station. The control system issues a clamping command to the clamp cylinder 37, and the clamp cylinder 37 pulls the clamp arm 316 of one side to slide along the slide-rail groove 315, and through the slider-and-link-rod mechanism, causes the one-side clamp arm 316 to drive the cross-link rod 314 to rotate, and at the same time the arcuate displacement of the other end of the cross-link rod 314 is converted into right sliding of the slider 313 and upward sliding of the clamp arm 316, thereby realizing clamping for the steel plate. It should be noted that, the steel plates are mostly waste steel cut from the shearing line, and has the feature that one side is neat while the other side is rough, therefore, the clamp portion of the clamp arm is set to have such feature that one side is neat and flat while the other side is jagged.

After the steel plate is clamped, the control system issues a stroke command to the stepper motor 31; the transmission shaft 319 drives the gear 318 to rotate, and through cooperation with the rack 317 fixed at the rail groove, drives the translational shaft 322 to slide in the rail groove 311, thus bringing the clamping-and-feeding unit fixed on the lifting platform 36 to move translationally, thereby realizing conveying function for the steel plates; the displacement detecting device 39 can accurately detect the position of the lifting platform 36, and transmit the position signal to the control system; after the signal is processed by the control system, the control system transmits a feedback signal to the stepper motor 31, thereby precisely controlling the conveying speed and conveying position for the steel plates.

As shown in FIGS. 9-11, 12A-12B, the disclosure provides a shredding-type shearing machine having its own clamping-feeding-and-pressing device; the shredding-type shearing machine mainly comprises: a shredding-type shearing device, and multi-flexible clamping-and-feeding device and a synchronous pressing device; the shredding-type shearing device comprises: a lower shearing edge 41, an upper shearing edge 42, a left wedge 43, a wear plate 44, a right wedge 45, a tool holder 46, a slider 47, an eccentric shaft 48, a frame 49, an adjusting screw 410 and a motor 411. As shown in FIG. 1, the upper shearing edge 42 is fixed to the tool holder 46 which is provided therein with the slider 47, and the motor 411 fixed on the frame 49 drives the eccentric shaft 48 in the slider 47, thus bringing the slider 47 to slide left and right and at the same time driving the tool holder 46 to move up and down, hence, through cooperation with the lower shearing edge 41 fixed on the frame 49, shearing motion can be accomplished. Due to the sliding wear between the slider and the tool holder as well as between the tool holder and the frame, the wear plate 44 is mounted on the left and right sides of the tool holder 46 and the upper and lower sides of the slider 47, for the purpose of easy maintenance and replacement. The gap between the tool holder 46 and the frame 49 is adjusted through adjustment of the pressing amount between the left wedge 43 and the right wedge 45 by the adjusting screw 410.

Figure 9:
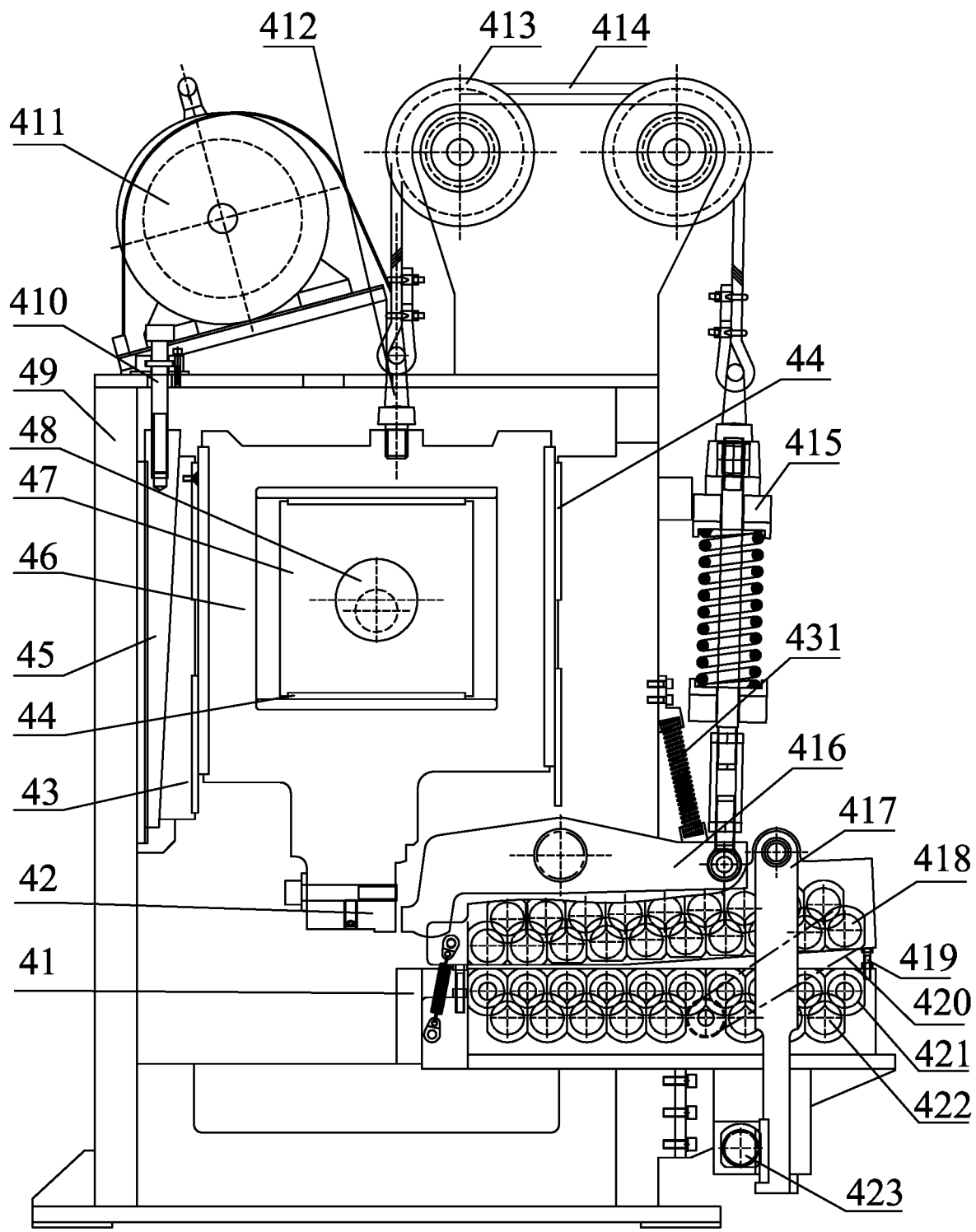
FIG. 9 is a front view of a shredding-type shearing device of the disclosure.
Figure 10:
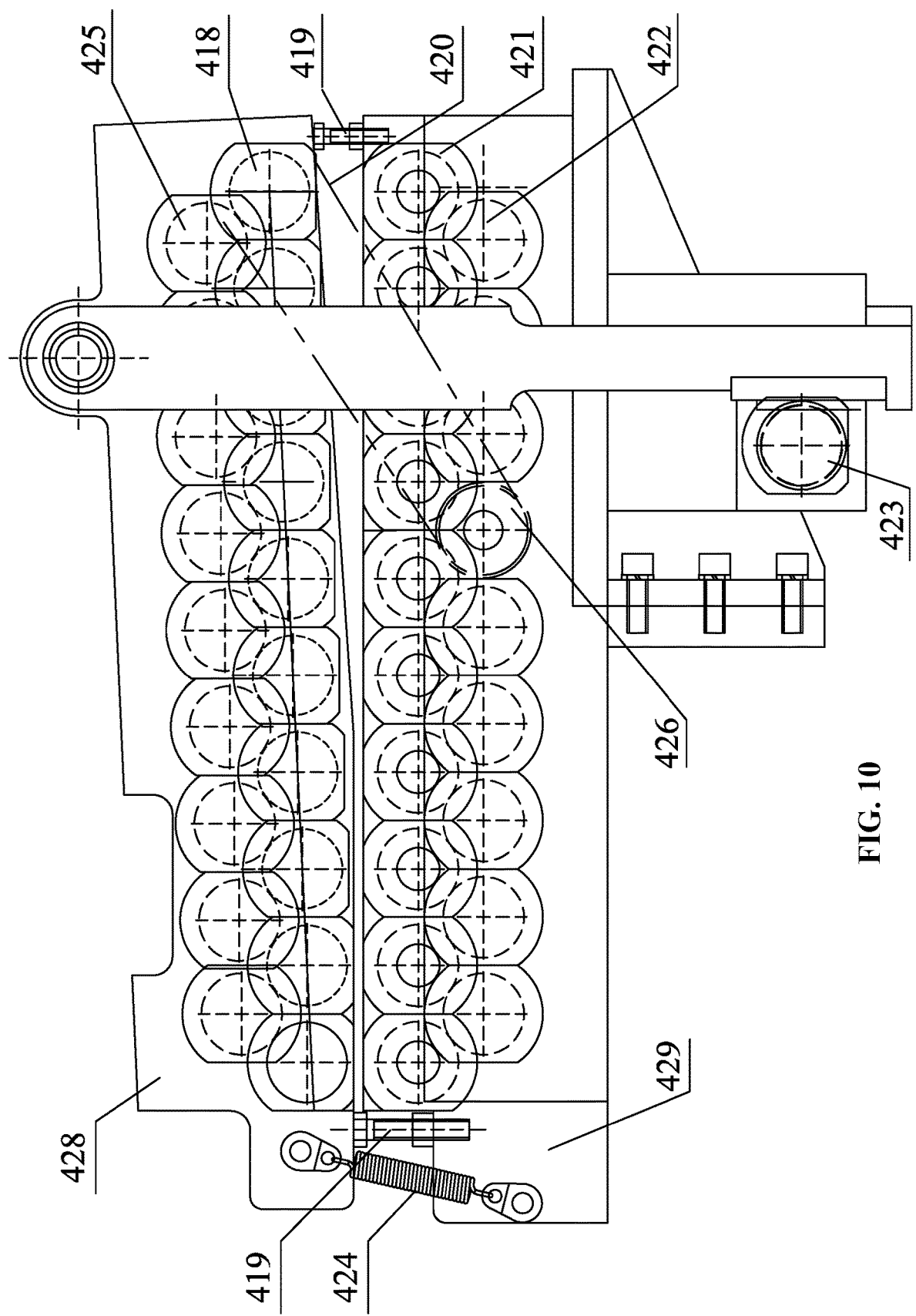
FIG. 10 is a front view of a multi-flexible clamping-and-feeding device of the disclosure.
Figure 11:
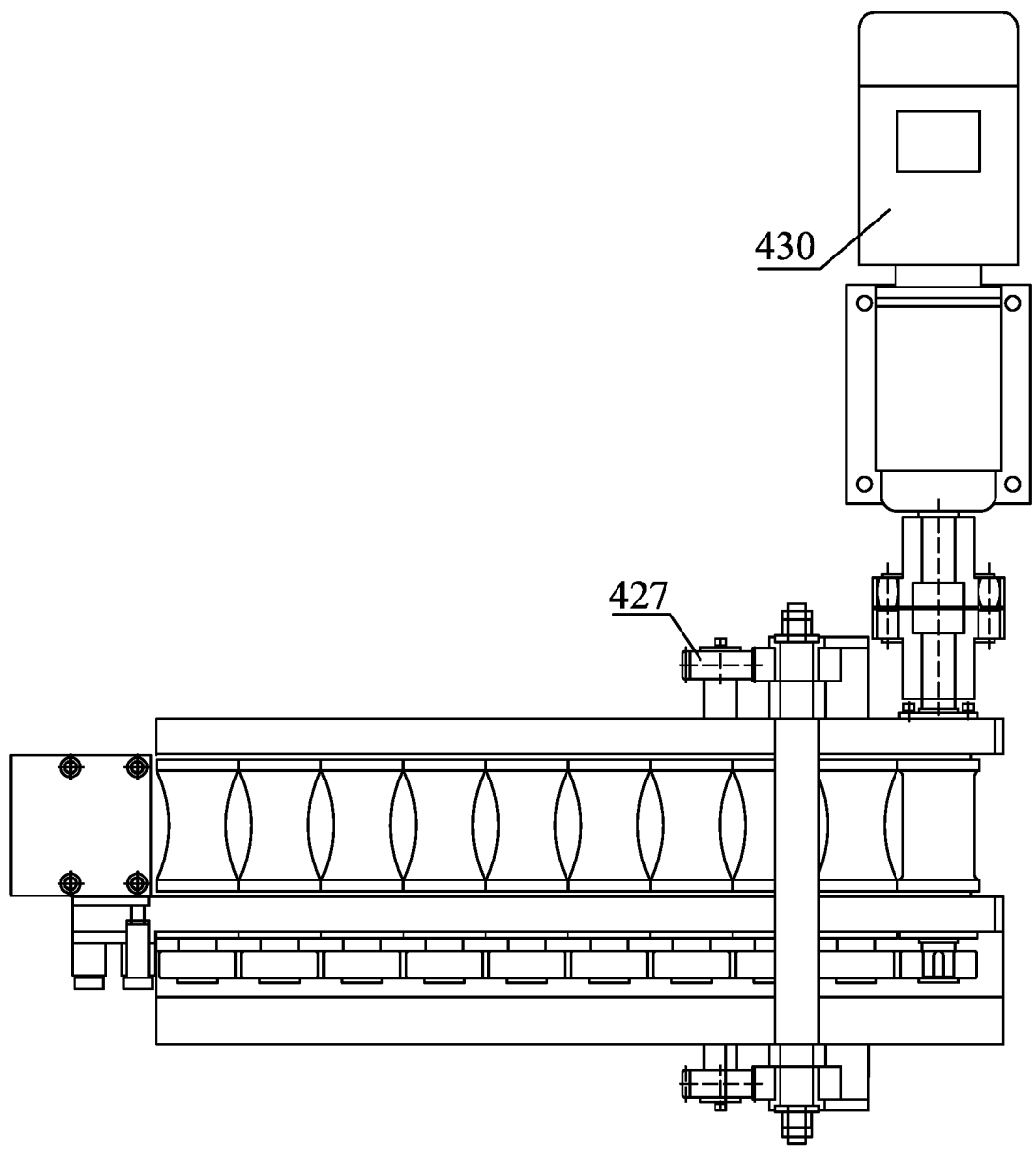
FIG. 11 is a top view of a multi-flexible clamping-and-feeding device of the disclosure.
Figure 12A:
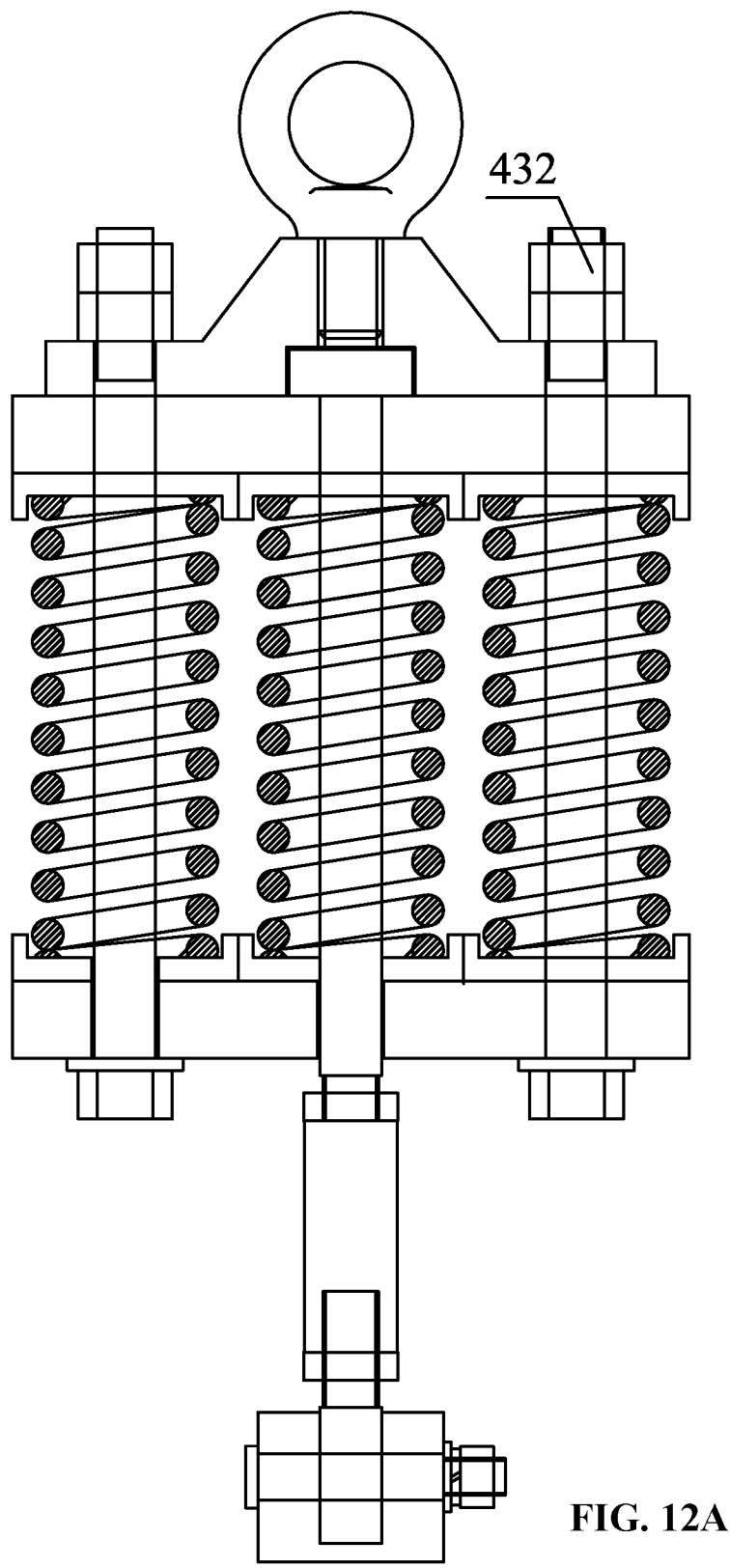
FIGS. 12A-12B are schematic diagrams of a spring set of the disclosure.
Figure 12B:
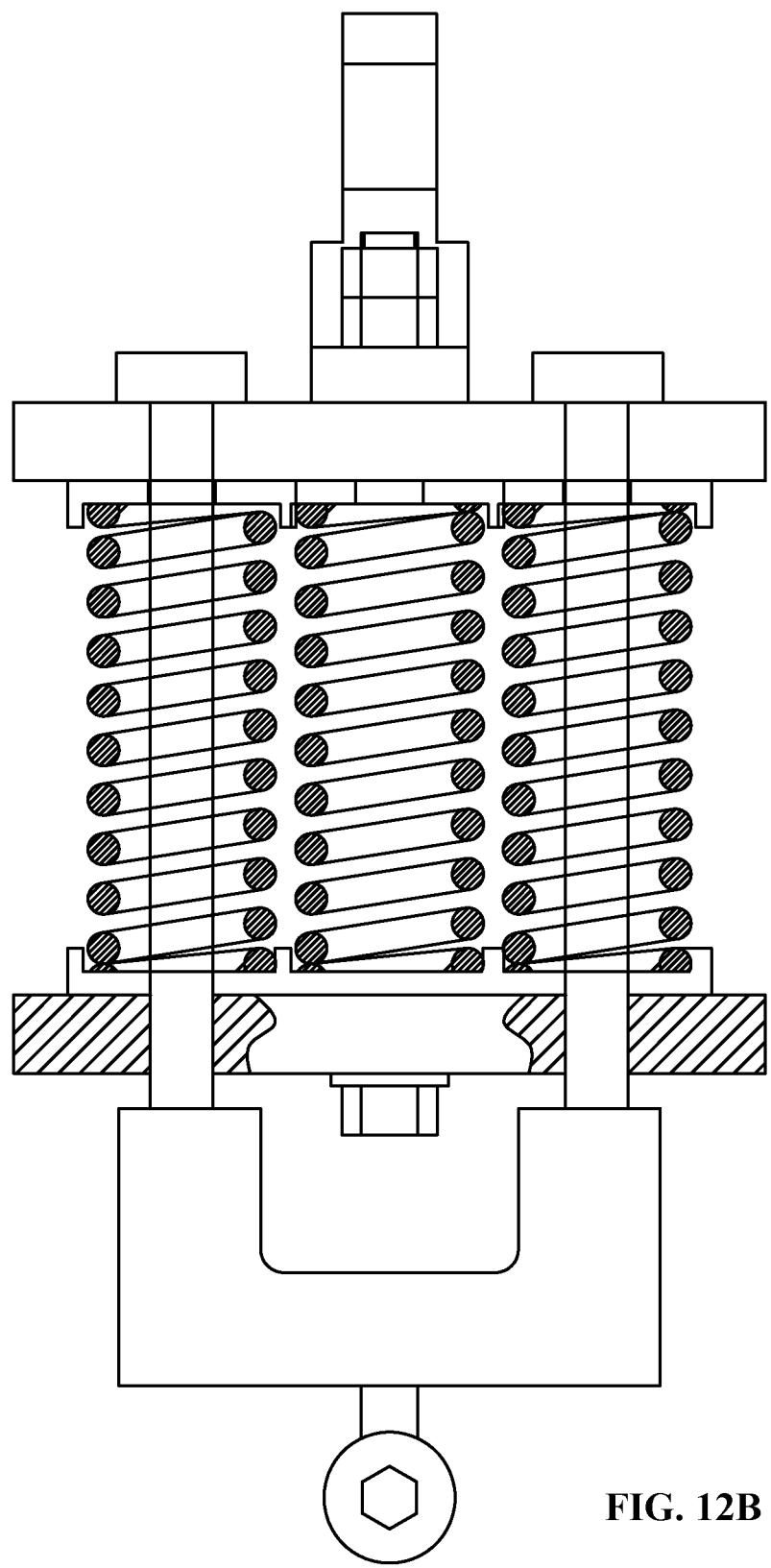

As shown in FIGS. 9-11, the multi-flexible clamping-and-feeding device can comprise an upper guide roller 418, a lower guide roller 421, a motor 411, a sprocket gear 426, a chain 420, an upper idler gear set 425, a lower idler gear set 422, an upper guide-roller frame 428, a lower guide-roller frame 429, a support screw 419, a tension spring 424, a rack 417, a gear 423 and a gear coupling shaft 427; the motor 430 for driving rollers is fixed on the lower guide-roller frame 29, and the motor 430 drives the lower guide roller 421 to rotate; to ensure that all the lower guide rollers 421 rotate in the same direction, the lower idler gear set 422 is used to provide transition between the guide rollers; the driving torque of the motor 430 for driving rollers is transmitted, through the sprocket gear 426 fixed on the lower idler gear set 422, and through the chain 420, to the upper guide roller 418; similarly, the upper guide rollers 418 adopt the same transition mode, and the upper idler gear set 425 ensures that the upper guide rollers 418 rotate in the same direction; the upper and lower guide rollers, and the upper and lower idler gear sets are respectively mounted on the upper and lower guide-roller frames 428, 429, and the upper and lower guide rollers rotate in opposite directions, so as to clamp and feed the steel plates to a shearing position. It should be noted that, due to the different sizes and specifications of the plates, the thicknesses and shapes of the plates are also irregular, if a gap between the upper and lower guide rollers is fixed, it will cause the plates to jam during clamping and feeding or the plates cannot enter the path of the pinch rollers. To solve the above problem, the upper guide-roller frame 428 is hinged on the rack 417, and the upper guide-roller frame 428 as a whole can rotate around the hinge point; the distance between the upper and lower guide rollers is adjusted by the support screws 419 at the left and right sides, while keeping a certain inclination angle, thus ensuring that strips of various thicknesses can smoothly enter the guide rollers; to prevent the plates from slipping in the guide rollers, the tension spring 424 is arranged at the exit of the plates, to ensure a certain pressing force is provided between the upper and lower guide rollers; meanwhile, due to the irregular shapes of the plates, there is a jam phenomenon when the strips enter the guide rollers; to avoid the jam phenomenon, the upper guide-roller frame 428 can drift up and down; further, to prevent deflection when the guide-roller frame drifts, the racks 417 hinged on both sides of the upper guide-roller frame are connected in series through the gear coupling shaft 427, thus ensuring the same drift displacement on both sides.

As shown in FIGS. 9 and 12, the synchronous pressing device comprises a lug ring 412, a rail wheel 413, a steel guide wire 414, a spring set 415 and a lever-type pressing frame 416. The lug ring 412 is connected to the tool holder 46, and the steel guide wire 414 is attached to the lug ring 412; the steel guide wire 414 is wound around the rail wheel 413 as transition and then connected to the spring set 415; the spring set drives the lever-type pressing frame 416 to rotated about a hinge point; as the tool holder 46 moves downward, the lug ring 412 brings the steel guide wire 414 and the spring set 415 to move, thus pulling the lever-type pressing frame 416 to press the plate; after the upper shearing edge completes shearing on the plate, and when the tool holder is in its return stroke, the lever-type pressing frame 416 is driven to rotate clockwise by the pressure of the pressure spring, so that the lever-type pressing frame 416 is separated from the strips. To meet the requirements of the working condition, the strips are required to be pressed tightly before the upper shearing edge comes into contact with the strips, therefore, the stroke of the lever-type pressing frame 416 is designed to be shorter than the stroke of the tool holder 46, and the differential stroke is offset by the elastic deformation of the spring set; moreover, the pressing force of the lever-type pressing frame 416 can be adjusted by adjusting the amount of preload of the preloaded spring 432.

The specific process is as follows: before the start of shearing, the support screws 419 are adjusted to ensure a certain opening degree between the upper and lower guide-roller frames, thus ensuring that strips of different thicknesses can smoothly enter. At the beginning of shearing, the upper and lower guide rolls are simultaneously rotated to feed the strips to the shredding-type shearing device. In the process of clamping-and-feeding, to ensure that a certain pressing force exists between the upper and lower guide rollers to avoid slipping of the strips, a tension spring 424 is arranged between the upper and lower guide rollers to provide a certain preloading force; meanwhile, to avoid the jam phenomenon caused by irregularity of the shape of the strip itself, the upper guide-roller frame can be driven by the rack 417 to drift up and down for a certain displacement.

When the strip reaches a shearing position of the upper shearing edge, the tool holder 46 slides downwardly under the drive of the eccentric shaft 48, meanwhile, the steel guide wire 414 pulls the lever-type pressing frame 416 to rotate counterclockwise to press the strips tightly; after the strip is pressed tightly and firmly, the upper and lower shearing edges cooperate to complete the shredding process on the strip. It should be noted that, although the tool holder 46 and the lever-type pressing frame 416 are connected in series, however, to ensure that the lever-type pressing frame 416 has pressed the strip tightly before the upper shearing edge shears, the stroke of the lever-type pressing frame is designed to be shorter than the stroke of the tool holder, and the differential stroke is offset by the elastic deformation of the spring set 415. After the shearing is completed, the tool holder moves upwardly, and the pressure spring pushes the lever-type pressing frame 416 to rotate clockwise, so that the strip is loosened, and then, under the driving of the clamping-and-feeding device, strips are continuously fed to the upper shearing edge, to complete subsequent shearing movement.

It will be obvious to those skilled in the art that changes and modifications may be made, and therefore, the aim in the appended claims is to cover all such changes and modifications.

What is claimed is:
1. A production line, comprising, in sequence:
an electromagnetic hoisting equipment;
a conveying platform;
a clamping-and-feeding device;
a segmentation shear;
a swing conveyor device;
a pushing device;
a rolling shear;
a chain conveyor track;
a material guiding device;
two shearing machines; and
a scrap collection device;
wherein:
the electromagnetic hoisting equipment is connected to the conveying platform, and is configured to hoist waste materials of steel rolling to the conveying platform;
the conveying platform is connected to the clamping-and-feeding device, and is configured to convey the waste materials of steel rolling to the clamping-and-feeding device;
the segmentation shear cooperates with the clamping-and-feeding device and is configured to segment the waste materials of steel rolling into steel plates;
the pushing device is configured to push the steel plates to the rolling shear;
the rolling shear cooperates with the pushing device to divide the steel plates along a width direction of the steel plates into strips;
the chain conveyor track is configured to convey the strips to the two shearing machines;
the material guiding device is disposed on one end of the chain conveyor track, and is configured to deliver the strips to the two shearing machines;
the two shearing machines are configured to further cut the strips into pieces; and
the scrap collection device is connected to the two shearing machines.

2. The production line of claim 1, wherein each of the two shearing machines comprises pinch rollers and a pressing device.

3. The production line of claim 1, wherein the conveying platform comprises a centering device and an auxiliary detecting device.

4. The production line of claim 1, wherein:
the clamping-and-feeding device comprises: a four-link-rod lifting mechanism, a self-centering clamping-and-feeding unit, a stepper transmission-and-driving device, and a first frame;
the four-link-rod lifting mechanism is configured to lift and lower the self-centering clamping-and-feeding unit; the stepper transmission-and-driving device is adapted to employ rack-and-pinion transmission to transfer the steel plates to the segmentation shear;
the four-link-rod lifting mechanism comprises a lifting hydraulic cylinder, a fixing block, a first link rod, a second link rod, a link-rod frame, a lifting platform and a first displacement detecting device; the lifting hydraulic cylinder is fixed on the stepper transmission-and-driving device by the fixing block; the lifting hydraulic cylinder is connected through the first link rod to the lifting platform which is connected to the second link rod; one end of the second link rod is hinged with the first link rod, and the other end is hinged with the link-rod frame which is fixed on the stepper transmission-and-driving device;
the self-centering clamping-and-feeding unit comprises: a fixed shaft, a clamp arm, a clamp cylinder, a first slider, a sliding block, a slide-rail groove, an articulation shaft and a cross-link rod; the slide-rail groove is mounted on the lifting platform and comprises the sliding block; the sliding block is fixed on the clamp arm; the fixed shaft is fixed on the lifting platform and is hinged to the center of the cross-link rod; both ends of the cross-link rod are hinged through the articulation shaft; the first slider is disposed in a chute of the clamp arm; the clamp cylinder is fixed on the lifting platform to pull the clamp arm to move up and down; the cross-link rod is adapted to rotate around an axis of the fixed shaft; and
the stepper transmission-and-driving device comprises a first gear, a first rack, a dual-output-shaft stepper motor, a second displacement detecting device, a stopper, a coupling, a transmission shaft, a ball bearing, a bearing seat, a translational shaft, a rolling bearing, and a rail groove; the dual-output-shaft stepper motor is adapted to transmit a driving torque through the coupling to the transmission shaft, and the transmission shaft is adapted to drive the first gear to rotate; the first rack is fixed on the upper surface of the rail groove by screws, and the first gear is adapted to drive the lifting platform to move translationally along the index line of the first rack.

5. The production line of claim 4, wherein the four-link-rod lifting mechanism further comprises a control system configured to receive a position signal of the first displacement detecting device and adjust the extension and contraction of the lifting hydraulic cylinder.

6. The production line of claim 4, wherein the clamp cylinder is adapted to drive one side of the clamp arm, and the link-rod-and-slider mechanism is adapted to pull the other side the clamp arm to move translationally, to achieve the automatic centering.

7. The production line of claim 4, wherein the four-link-rod lifting mechanism and the self-centering clamping-and-feeding unit are fixed on the translational shaft; the translational shaft bears the weight of the four-link-rod lifting mechanism and the self-centering clamping-and-feeding unit, and the transmission shaft is adapted to provide the driving torque.

8. The production line of claim 4, wherein the rail groove of the stepper transmission-and-driving device is provided with a stop block.

9. The production line of claim 1, wherein:
each of the two shearing machines comprises: a shearing unit, a multi-flexible clamping-and-feeding device, and a synchronous pressing device; the synchronous pressing device is connected in series to an upper shearing edge of the shearing unit;
the shearing unit comprises a second frame, a tool holder, an eccentric shaft, a first motor, a second slider, a left wedge, a right wedge, a wear plate, the upper shearing edge and a lower shearing edge; the upper and lower shearing edges are respectively fixed on the tool holder and the second frame; the first motor is fixed on the second frame, and the first motor is adapted to drive the eccentric shaft to rotate; the eccentric shaft is adapted to drive the second slider to move horizontally, and is adapted to drive the tool holder to move up and down;
the multi-flexible clamping-and-feeding device comprises an upper guide roller, a lower guide roller, a second motor, a sprocket gear, a chain, an upper idler gear set, a lower idler gear set, an upper guide-roller frame, a lower guide-roller frame, a support screw, a tension spring, a second rack, a second gear and a gear coupling shaft; the second motor is fixed on the lower guide-roller frame, and the second motor is adapted to drive the lower guide roller to rotate; the upper and lower guide rollers, and the upper and lower idler gear sets are respectively mounted on the upper and lower guide-roller frames, and the tension spring is arranged at the exit of the steel plates; and
the synchronous pressing device comprises a lug ring, a steel guide wire, a rail wheel, a spring set, a pressure spring and a lever pressing frame; the lug ring is fixed on the tool holder and connected to the steel guide wire; the steel guide wire is wound around the rail wheel and connected to the spring set; the lower end of the spring set is connected to the lever pressing frame which is hinged on the second frame.

10. The production line of claim 9, wherein a stroke of the lever pressing frame is shorter than that of the tool holder, and a stroke difference is compensated by an elastic deformation of the spring set.

11. The production line of claim 9, wherein a pressing force of the lever pressing frame is adjusted by a preload amount of the spring set.

12. The production line of claim 9, wherein a pressing amount of the right wedge is adapted to adjust a gap between left and right sides of the tool holder.

* * * * *